United States Patent
Buch et al.

(10) Patent No.: US 10,866,588 B2
(45) Date of Patent: Dec. 15, 2020

(54) SYSTEM AND METHOD FOR LEVERAGING END-TO-END DRIVING MODELS FOR IMPROVING DRIVING TASK MODULES

(71) Applicant: Toyota Research Institute, Inc., Los Altos, CA (US)

(72) Inventors: Shyamal D. Buch, Stanford, CA (US); Adrien D. Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 303 days.

(21) Appl. No.: 15/914,520

(22) Filed: Mar. 7, 2018

(65) Prior Publication Data
US 2019/0113917 A1    Apr. 18, 2019

Related U.S. Application Data

(60) Provisional application No. 62/572,787, filed on Oct. 16, 2017.

(51) Int. Cl.
*G05D 1/00* (2006.01)
*G05D 1/02* (2020.01)
(Continued)

(52) U.S. Cl.
CPC .......... *G05D 1/0088* (2013.01); *B60W 30/00* (2013.01); *G05B 13/028* (2013.01);
(Continued)

(58) Field of Classification Search
CPC .. G05D 1/0088; G05D 1/0221; G05D 1/0285; G05D 2201/0213; G06N 3/00;
(Continued)

(56) References Cited

U.S. PATENT DOCUMENTS

| 9,053,433 B2 | 6/2015 | Will et al. |
| 2017/0068888 A1 | 3/2017 | Chung et al. |

(Continued)

OTHER PUBLICATIONS

M. Bojarski, D. D. Testa, D. Dworakowski, B. Firner, B. Flepp, P. Goyal, L. D. Jackel, M. Monfort, U. Muller, J. Zhang, X. Zhang, J. Zhao, K. Zieba, "End to End Learning for Self-Driving Cars," https://arxiv.org/abs/1604.07316; Apr. 25, 2016.

(Continued)

*Primary Examiner* — Basil T. Jos
(74) *Attorney, Agent, or Firm* — Christopher G. Darrow; Darrow Mustafa PC (57) ABSTRACT

System, methods, and other embodiments described herein relate to improving training of sub-modules for autonomously controlling a vehicle. In one embodiment, a method includes generating projected controls for autonomously controlling the vehicle through a driving scene by analyzing sensor data about the driving scene using an end-to-end (E2E) model. The E2E model is based, at least in part, on at least one of the sub-modules. The method includes training the E2E model according to the projected controls and labels for the sensor data that indicate expected controls for driving the vehicle through the driving scene. The method includes transferring electronic data of the E2E model into the at least one of the sub-modules associated with the E2E model to initialize the at least one of the sub-modules to improve operation of the at least one sub-modules at sub-tasks for autonomously controlling the vehicle.

20 Claims, 5 Drawing Sheets

(51) Int. Cl.
   *G05B 13/02* (2006.01)
   *B60W 30/00* (2006.01)
   *G06N 3/00* (2006.01)

(52) U.S. Cl.
   CPC ......... *G05D 1/0221* (2013.01); *G05D 1/0285* (2013.01); *G06N 3/00* (2013.01); *G05D 2201/0213* (2013.01)

(58) Field of Classification Search
   CPC .... G06N 3/0454; G06N 3/084; G06N 3/0481; B60W 30/00; G05B 13/028
   See application file for complete search history.

(56) References Cited

U.S. PATENT DOCUMENTS

| | | | |
   |---|---|---|---|
   | 2017/0206431 A1 | 7/2017 | Sun et al. | |
   | 2017/0262735 A1 | 9/2017 | Ros Sanchez et al. | |
   | 2017/0278018 A1 | 9/2017 | Mnih et al. | |
   | 2020/0004249 A1* | 1/2020 | Yu | G05D 1/0259 |

OTHER PUBLICATIONS

H. Xu, Y. Gao, F. Yu, T. Darrell, "End-to-end Learning of Driving Models from Large-scale Video Datasets," https://arxiv.org/abs/1612.01079; Dec. 4, 2016.

D. Pathak, R. Girshick, P. Dollar, T. Darrell, B. Hariharan, "Learning Features by Watching Objects Move," https://arxiv.org/abs/1612.06370; Dec. 19, 2016.

P. Agrawal, J. Carreira, J. Malik, "Learning to See by Moving," https://arxiv.org/abs/1505.01596; May 7, 2015.

M. Bojarski, P. Yeres, A. Choromanska, K. Choromanski, B. Firner, L. Jackel, U. Muller, "Explaining How a Deep Neural Network Trained with End-to-End Learning Steers a Car," https://arxiv.org/abs/1704.07911; Apr. 25, 2017.

J. Redmon, A. Farhadi, "YOLO9000: Better, Faster, Stronger," https://arxiv.org/abs/1612.08242; Dec. 25, 2016.

Lin, A. Milan, C. Shen, I. Reid, "RefineNet: Multi-Path Refinement Networks for High-Resolution Semantic Segmentation," https://arxiv.org/abs/1611.06612; Nov. 20, 2016.

* cited by examiner

SYSTEM AND METHOD FOR LEVERAGING END-TO-END DRIVING MODELS FOR IMPROVING DRIVING TASK MODULES

CROSS-REFERENCE TO RELATED APPLICATIONS

This application claims benefit of U.S. Provisional Application No. 62/572,787, filed on, Oct. 16, 2017, which is herein incorporated by reference in its entirety.

TECHNICAL FIELD

The subject matter described herein relates in general to systems and methods for using deep learning to facilitate autonomous driving and, more particularly, to training an end-to-end model on driving tasks and using aspects of the trained end-to-end model to subsequently initialize deep learning models for driving sub-tasks.

BACKGROUND

One approach to autonomy within self-driving car systems involves designing separate modules that perform different sub-tasks/functions (e.g., perception, obstacle detection, path planning, etc.) in order to provide for the broader self-driving functionality. A self-driving vehicle may use modules geared to sub-tasks because of clearer interpretability and simpler safety certification. However, such modules are heavily dependent on manually annotated data that is specific to tasks associated with the particular modules, and the manually annotated data is generally expensive because of the manual manner in which such data is produced. Thus, implementing individual modules can be expensive and potentially less capable because of the limited availability of the manually annotated data.

By contrast, end-to-end (E2E) driving systems generally use a single module that accepts sensor inputs and produces driving control signals as outputs. Moreover, the E2E approach can use data that is not manually annotated and is thus much more reasonable (e.g., less expensive) to acquire and more abundant. However, because the E2E approach is a black box-esque approach to self-driving, analysis of internal functionality, interpretability, and safety certification of the E2E model can represent significant difficulties.

SUMMARY

In one embodiment, example systems and methods relate to a manner of using an end-to-end model to initialize modules that perform sub-tasks for autonomous driving functionality. For example, in one approach, a training system implements an end-to-end (E2E) model according to a defined driving task or action. That is, the E2E model is designed in a manner so as to accept electronic inputs from sensors and produce a driving control signal as an output that is related to the particular action/task (e.g., perception-based function or other driving function). Accordingly, the training system trains the E2E model on the overall driving task using sensor data about surroundings of a vehicle and feedback in the form of driver inputs correlating with expected driving controls.

In one embodiment, the training system then uses the trained E2E model to initialize sub-modules for sub-tasks of autonomous driving. The sub-modules can include perception modules, semantic segmentation modules, obstacle avoidance modules, path planning modules, and so on. In either case, the training system transfers data of the E2E model into the sub-modules so that the sub-modules are pre-trained according to the E2E approach. In various implementations, a particular form of how the training system transfers the learned data into the sub-modules can vary. For example, the training can copy layers from within the E2E model directly into the sub-modules, copy learned weights, feature maps, and so on. In either case, subsequently, the sub-modules can be further tuned (i.e., trained) in order to refine training of the sub-modules that have been modified with the learned information on the specific tasks particular to the respective sub-modules. Thus, the sub-modules can then be implemented to provide autonomous driving functionality. In this way, the training trains the sub-modules using available sensor data and driver controls as opposed to specific human-annotated training data thereby improving training of the sub-modules and by extension autonomous driving functionality overall.

In one embodiment, a training system for improving training of sub-modules for autonomously controlling a vehicle is disclosed. The training system includes one or more processors and a memory communicably coupled to the one or more processors. The memory storing a learning module including instructions that when executed by the one or more processors cause the one or more processors to generate projected controls for autonomously controlling the vehicle through a driving scene by analyzing sensor data about the driving scene using an end-to-end (E2E) model. The E2E model is based, at least in part, on at least one of the sub-modules. The learning module includes instructions to train the E2E model according to the projected controls and labels for the sensor data that indicate expected controls for driving the vehicle through the driving scene. The memory storing a transfer module including instructions that when executed by the one or more processors cause the one or more processors to transfer electronic data of the E2E model into the at least one of the sub-modules associated with the E2E model to initialize the at least one of the sub-modules to improve operation of the at least one sub-modules at sub-tasks for autonomously controlling the vehicle.

In one embodiment, A non-transitory computer-readable medium for improving training of sub-modules for autonomously controlling a vehicle is disclosed. The non-transitory computer-readable medium including instructions that when executed by one or more processors cause the one or more processors to perform various functions. The instructions include instructions to generate projected controls for autonomously controlling the vehicle through a driving scene by analyzing sensor data about the driving scene using an end-to-end (E2E) model, wherein the E2E model is based, at least in part, on at least one of the sub-modules. The instructions include instructions to train the E2E model according to the projected controls and labels for the sensor data that indicate expected controls for driving the vehicle through the driving scene. The instructions include instructions to transfer electronic data of the E2E model into the at least one of the sub-modules associated with the E2E model to initialize the at least one of the sub-modules to improve operation of the at least one sub-modules at sub-tasks for autonomously controlling the vehicle.

In one embodiment, a method for improving training of sub-modules for autonomously controlling a vehicle is disclosed. In one embodiment, a method includes generating projected controls for autonomously controlling the vehicle through a driving scene by analyzing sensor data about the driving scene using an end-to-end (E2E) model. The E2E model is based, at least in part, on at least one of the sub-modules. The method includes training the E2E model according to the projected controls and labels for the sensor data that indicate expected controls for driving the vehicle through the driving scene. The method includes transferring electronic data of the E2E model into the at least one of the sub-modules associated with the E2E model to initialize the at least one of the sub-modules to improve operation of the at least one sub-modules at sub-tasks for autonomously controlling the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with using an E2E model to pre-train sub-modules for autonomous driving are disclosed. As mentioned previously, training sub-modules for particular autonomous driving-related tasks presents difficulties in relation to acquiring training data due to high costs associated with the manual efforts to annotate the data. Furthermore, using E2E models instead of task-specific sub-modules presents separate difficulties since such "black box" systems are generally difficult to interpret, susceptible to adversarial attacks, and difficult to certify for safety/regulatory purposes.

Therefore, in one embodiment, a disclosed training system improves the noted approaches by combining aspects of learning using an E2E model along with using respective sub-modules to perform autonomous driving tasks. That is, the training system, in one example, leverages cost-efficient labeled data that is useful for training an E2E model to train the E2E model on a particular task or set of tasks, and then re-purpose relevant aspects of learned information from within the E2E model to initialize/pre-train the respective sub-modules.

In general, the labeled data is sensor data which the training acquires from one or more sensors of a vehicle in combination with, for example, driver control inputs or other indicators about a driving scene embodied by the sensor data that may be useful when controlling the vehicle. Thus, the sensor data is labeled with the additional data to provide training data that correlates an overall driving scene with particular controls/indicators. Accordingly, while such information may not be ideal for directly training the respective sub-modules, the information is useful for training the E2E model. Consequently, the training trains the E2E model using the annotated data such that E2E model learns which sensor inputs correlate with particular driving controls/actions/tasks.

The training can then acquire learned information from the E2E model that pertains to, for example, how the E2E model represents aspects of the driving scene as embodied by the sensor inputs. That is, even though the E2E model is not specifically configured to perform classifications/identifications or other functions specific to the sub-modules, the learned information included within the trained E2E model is nevertheless pertinent to the tasks associated with the sub-modules. Accordingly, the training parses the E2E model or otherwise identifies the relevant learned information included therein and uses the learned information to initialize the sub-modules. The learned information is in the form of, for example, trained layers of a neural network that comprises the E2E model, learned weights of nodes within the E2E model, or in another form.

In one embodiment, the training can then initialize the sub-modules by inserting the learned information into the sub-modules such that the learned information is integrated within the sub-modules as though the sub-modules have been at least partially trained. In further aspects, the training can further train/refine the sub-modules on respective tasks in order to further improve training. However, it should be appreciated that initializing the sub-modules in the disclosed manner provides for improved performance of the sub-modules at the specific tasks over training the sub-modules directly without the initializing. In this way, the training improves the sub-modules by avoiding training through using costly manually annotated training data while also leveraging learned information from the E2E model to improve the operation of the sub-modules.

Figure 1:
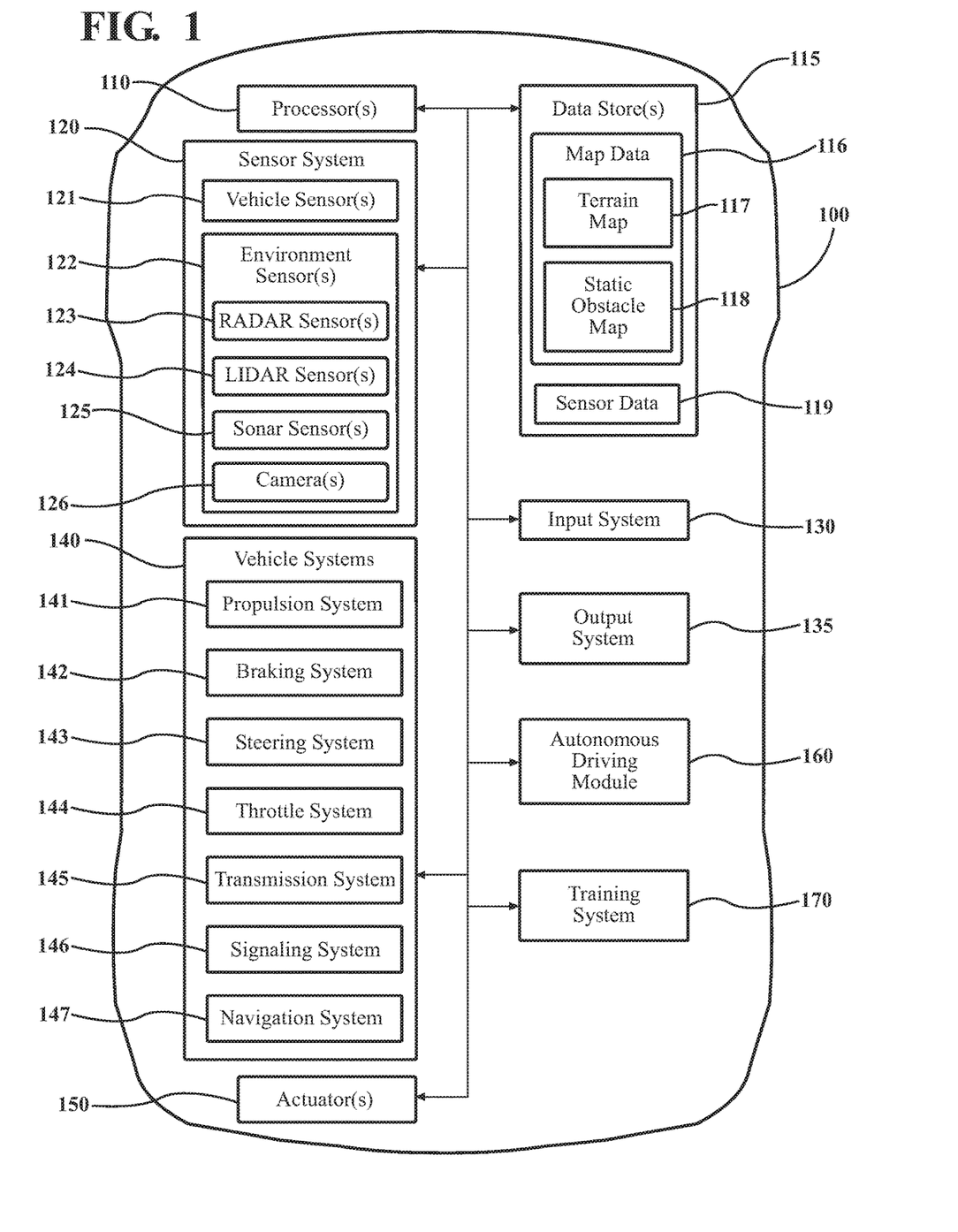
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, can operate autonomously or at least can collect data from sensors when being operated manually as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes, in one embodiment, a training system 170 that is implemented to perform methods and other functions as disclosed herein relating to using an end-to-end model to pre-train sub-modules for autonomous driving tasks. It should be appreciated, that while the training system 170 is illustrated as being a part of the vehicle 100, in various embodiments, the training system 170 is a separate component from the vehicle 100 that can be provided as a centralized server, a cloud-based service, and so on. The noted functions and methods will become more apparent with a further discussion of the figures.

As an additional note, the vehicle 100 is illustrated as including an autonomous driving module 160. The autonomous driving module 160, in one embodiment, is comprised of a plurality of sub-modules that each perform a respective task in relation to autonomously operating the vehicle 100. That is, the autonomous driving module 160 includes sub-modules that, in combination, determine travel path(s), current autonomous driving maneuvers for the vehicle 100, future autonomous driving maneuvers and/or modifications to current autonomous driving maneuvers. The autonomous driving module 160 performs the noted actions based, at least in part, on data acquired by the sensor system 120, and/or data from other suitable source. In general, "driving maneuver" refers to one or more actions that affect the movement of a vehicle. Examples of driving maneuvers include: accelerating, decelerating, braking, turning, moving in a lateral direction of the vehicle 100, changing travel lanes, merging into a travel lane, reversing, and so on. The autonomous driving module 160 implements the determined driving maneuvers to cause the vehicle 100 to operate independently of manual driver control inputs. Further aspects of the autonomous operation of the vehicle 100 will be discussed subsequently.

Figure 2:
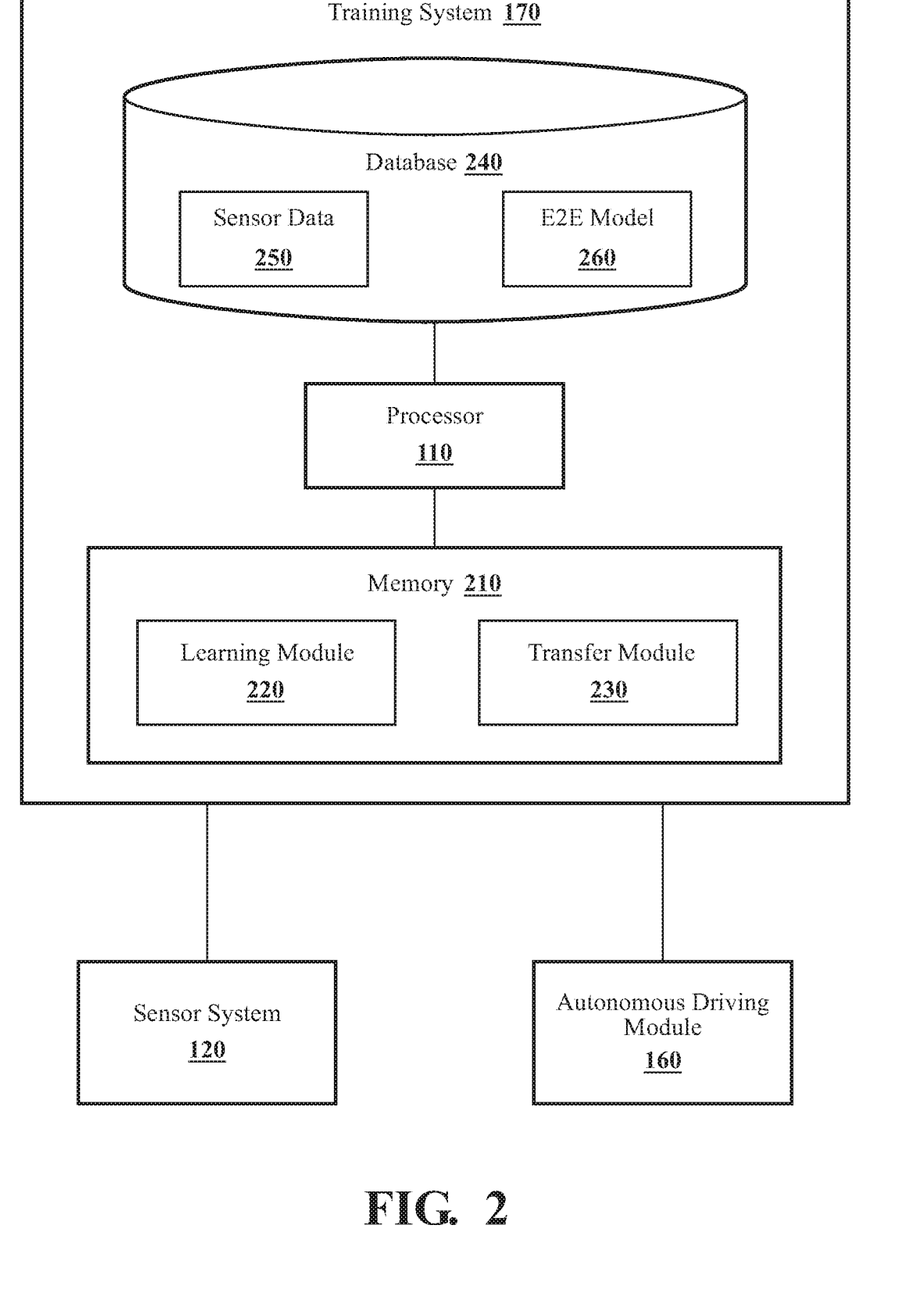
FIG. 2 illustrates one embodiment of a training system that is associated with using an E2E model to pre-train sub-modules for autonomous driving.

With reference to FIG. 2, one embodiment of the training system 170 of FIG. 1 is further illustrated. The training system 170 is shown as including a processor 110 from the vehicle 100 of FIG. 1. Accordingly, the processor 110 may be a part of the training system 170, the training system 170 may include a separate processor from the processor 110 of the vehicle 100, or the training system 170 may access the processor 110 through a data bus or another communication path. In one embodiment, the training system 170 includes a memory 210 that stores a learning module 220 and a transfer module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. Moreover, it should be appreciated that while the training system 170 is illustrated as being wholly embodied within the vehicle 100, in various embodiments, one or more aspects of the training system 170 are implemented as cloud-based services, centralized OEM services, and so on.

In either case, in one embodiment, the learning module 220 generally includes instructions that function to control the processor 110 to collect sensor data 250 from one or more sensors 120 of the vehicle 100. While the learning module 220 is generally discussed as directly collecting the sensor data 250, in various embodiments, the learning module 220 can instead crowd-source the sensor data 250 from a variety of devices in order to obtain a robust data set for embodied as the sensor data 250 for training the E2E model 260.

The sensor data 250 includes, in one embodiment, observations about various aspects of a driving scene, otherwise referred to as a surrounding/proximate environment of the vehicle 100. The driving scene is the environment through which the vehicle is traveling. Thus, the sensor data 250 generally includes observations of one or more objects, obstacles, buildings, roadway features, and/or other aspects about the surroundings that are encountered by the vehicle 100 and for which information is generally useful when navigating through the environment. Moreover, the learning module 220 also collects information about the vehicle 100 that is included as part of the sensor data 250. For example, the sensor data 250 includes electronic control signals collected from inputs generated by a driver, telematics data, IMU data, and so on.

Additionally, as provided for herein, the learning module 220 receives sensor data from, for example, at least the LIDAR 124. The learning module 220, in various embodiments, also receives additional information as part of the sensor data 250 such as camera images, radar data, and, more generally, any information which can be provided from sensors of the vehicle 100 about objects, trajectories of the objects, and further aspects of a roadway, terrain, the driver, the vehicle 100, and so on.

Accordingly, in one embodiment, the training system 170 includes the database 240 as a means of storing various data elements. The database 240 is, in one embodiment, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the noted sensor data 250, at least one E2E model 260, and or other information that is used by the modules 220 and/or 230.

In either case, the learning module 220 can instantiate the E2E model 260 to analyze the sensor data 250 and train the E2E model 260 therefrom. For example, the E2E model 260 can be implemented to produce, as electronic output, a particular driving task/label such as stop, turn left, move steering wheel by x degrees, change lanes, or another driving control or identifying label. In various aspects, the particular granularity of the task/label may differ (e.g., change lanes vs. move steering wheel by x degrees) depending on a particular approach.

The learning module 220 trains the E2E model 260 on the sensor data 250 including, in one embodiment, the manual controls provided by the operator/driver. The learning module 220 uses the signals about the manual controls as included with the sensor data 250 to annotate/label the collection of sensor data about a particular scene. Thus, the sensor data 250 generally correlates particular driving scenes with expected controls for navigating the vehicle 100 through the scene. Moreover, the learning module 220 can automatically label the sensor data 250 by simply correlating the separate pieces of information instead of manual annotations as may be necessary for other more specific training data. In this way, the sensor data 250 can be easily collected because of the simplicity associated with generating the sensor data 250. Therefore, the sensor data 250 represents an improvement over manually annotated data.

The learning module 220 then uses the sensor data 250 in order to train the E2E model 260. In one embodiment, the learning module 220 analyzes the sensor data 250 using the E2E model. As a result of this analysis, the learning module 220 acquires projected controls from the E2E model 260 for controlling the vehicle 100 through the driving scene depicted in the particular sensor data that was provided as an input. It should be appreciated that while a single result is discussed for a single driving scene, the noted process is executed iteratively over many successive temporal instances within a single driving scene and subsequent driving scenes to train the E2E model 260.

Thus, the learning module 220, in one embodiment, uses the annotations/labels of the sensor data 250 that indicate the expected controls as a comparison with the projected controls to assess the determination of the E2E model 260. According to the assessment, the learning module 220 can backpropagate data about whether the projected controls correlate with the expected control signals from the labeled sensor data 250. In general, the learning module 220 backpropagates the information to adjust weights and/or other aspects of nodes/layers within the E2E model 260 to learn better how to produce projected controls according to the sensor data 250.

The E2E model 260 itself can be characterized as a manner of imitating a human driver in the sense that the E2E model 260 acquires the sensor data 250 as inputs and provides driving actions as electronic outputs. Thus, the E2E model 260 is perceiving the overall driving scene and providing the controls in a similar manner as a human driver may perceive the scene and provide controls. In various embodiments, the E2E model 260 can be implemented according to different machine learning algorithms. For example, the E2E model 260 can be a deep learning algorithm such as a convolutional neural network (CNN) or a variant thereof, a recurrent neural network (RNN) or variant thereof, a long short-term memory (LSTM) recurrent neural network, a hybrid combination of networks, and so on. In general, the E2E model 260 is not limited to a particular algorithmic approach but is instead intended to encompass a machine learning algorithm for learning the driving task from initial sensory inputs to driving controls as the outputs.

Consequently, in one embodiment, the E2E model 260 is implemented to provide driving controls as outputs that reflect changes in the surrounding environment as embodied within the sensor data 250. That is, in one aspect, the E2E model 260 is implemented in a manner so as to be reactive to changes within the surroundings that affect the driving tasks. By implementing the E2E model 260 in this manner, the E2E model 260 provides an understanding of the surroundings (particular driving scene) that is connected to the control outputs produced therefrom instead of in a disconnected piecewise manner as may be seen with purpose-built sub-modules. Moreover, by implementing the E2E model 260 to provide actions that are a function of the presence of an object, a change in the surrounding scene, or another influential aspect of the driving scene, the learning module 220 can facilitate transferring information into the sub-modules 160 because of the manner in which the driving scene is analyzed. Thus, the driving tasks/labels, which a particular instantiation of the E2E model 260 may be designed around, are generally conditioned on aspects (e.g., dynamic aspects that induce driving reactions) of the driving scene.

Accordingly, in one embodiment, the E2E model 260 is an extended network that is based, at least in part, on a perception module or another sub-module but has been extended in the sense that the E2E model 260 includes, in one embodiment, shared hierarchical representation layers that may be similar to those of the sub-modules. However, the E2E model 260 is generally designed also to include the extended aspects which are additional task layers such as driving layers, and so on.

As an additional note, while the E2E model 260 is discussed as being stored in the database 240, of course, in various implementations various data structures, logic, and other aspects of the E2E model 260 are integrated with the learning module 220. Moreover, while the autonomous driving module 160 is shown as a separate entity that is included within the vehicle 100, the module 160 and/or sub-modules thereof can be, at least temporarily, integrated within the training system 170.

Once the E2E model 260 has been trained using the sensor data 250, the learned information produced from the training that is embodied within the E2E model 260 can be transferred to the sub-modules of the autonomous driving module 160. Thus, in one embodiment, the transfer module 230 generally includes instructions that function to control the processor 110 to transfer the learned information from the E2E model 260 into the module 160. In one embodiment, the E2E model 260 directly transfers learned weights of different layers and interconnected elements from the model 260. In further aspects, the transfer module 230 transfers layers of the neural network that comprise the E2E model 260 into the module 160. In this way, the training system 170 can leverage the training data to obtain learned information that is then transferred into sub-modules of the autonomous driving module 160. As a further note, the transfer module 230, in one embodiment, executes pre-processing/filtering on the information from the E2E model 260 in order to provide the learned information in a form that better correlates with the sub-modules.

Figure 3:
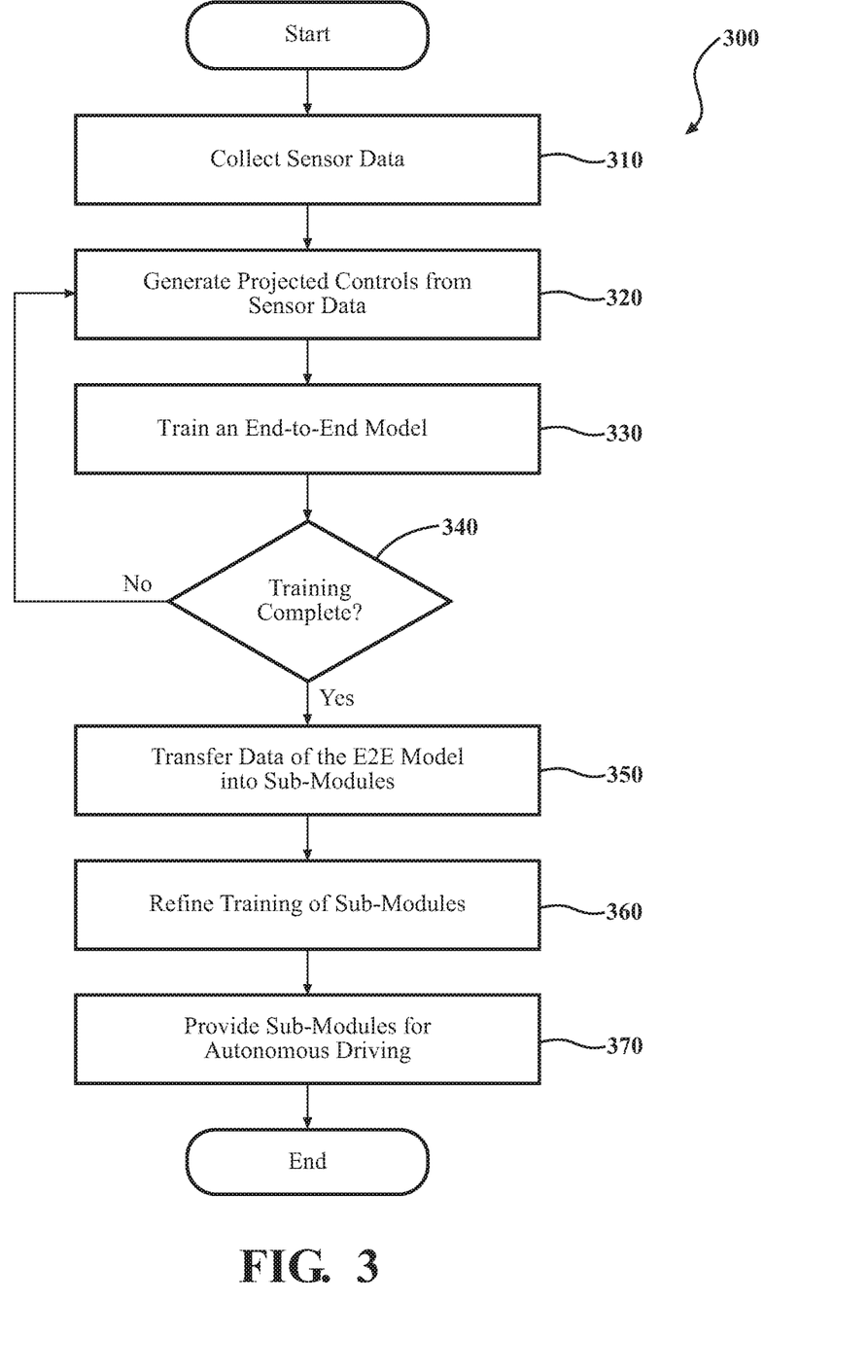
FIG. 3 illustrates one embodiment of a method associated with using an E2E model to pre-train sub-modules for autonomous driving.

Additional aspects of pre-training or otherwise initializing the sub-modules for autonomous driving using an E2E model will be discussed in relation to FIG. 3. FIG. 3 illustrates a flowchart of a method 300 that is associated with training an end-to-end model and transferring learned information from the E2E model into sub-modules of an autonomous driving system. Method 300 will be discussed from the perspective of the training system 170 of FIGS. 1 and 2. While method 300 is discussed in combination with the training system 170, it should be understood that the method 300 is not limited to being implemented within the training system 170, but is instead one example of a system that may implement the method 300.

At 310, the learning module 220 collects the sensor data 250 using sensors of the vehicle 100. In one embodiment, the learning module 220 collects data from multiple synchronized sensors in order to acquire a comprehensive perception of a surrounding environment of the vehicle 100 and thus various aspects that may influence control of the vehicle 100. Moreover, in addition to collecting data from environmental sensors and vehicle sensors, the learning module 220, in one embodiment, collects control signal data produced from driver inputs (e.g., steering wheel, brakes, accelerator, shifter, etc.) in order to acquire control information that is correlated with the information perceived about the surrounding environment. Accordingly, together the separate data elements form the sensor data 250 that is electronically stored in the database 240. As previously explained, the control signal data annotates the data collected from the sensors in order to provide the sensor data 250 with data indicating expected controls for the vehicle 100 that directly correspond to the driving scene embodied by the sensor data.

As an additional note, it should be appreciated that the learning module 220 may, alternatively or additionally, acquire the sensor data 250 by crowd-sourcing the sensor data 250 from many different vehicles. Moreover, the sensor data 250, in one embodiment, does not include information gathered directly by the vehicle 100. That is, the sensor data 250 may be wholly acquired through harvesting the data 250 from other vehicles that is collected in a cloud-based service or centralized repository. Furthermore, the sensor data 250 may be acquired as a pre-generated data set that is provided by a third party.

In either case, the form of the data 250 is generally such that observations from sensor signals are correlated with driver control inputs so that when combined the sensor data 250 is intrinsically labeled/annotated with driving tasks. In further examples, the sensor data 250 is filtered or analyzed in order to refine labels/annotations or otherwise format that sensor data 250 into a universal formatting (e.g., XML). Consequently, the sensor data 250 can be used to train the E2E model 260 according to the labeled/annotated tasks or actions.

At 320, the learning module 220 analyzes the sensor data 250 using the E2E model 260 to generate projected controls. In one embodiment, the learning module 220 provides a subset of the sensor data 250 to the E2E model 260. For example, a particular implementation of the E2E model 260 can be customized to train a particular one of the sub-module within the autonomous driving module 160. Thus, the learning module 220 may provide a particular subset of the sensor data 250 that is applicable to one of the noted sub-modules and/or that correlates with available sensors within the vehicle 100. In either case, the learning module 220 initially uses the E2E model 260 to, for example, analyze the sensor data 250 and produce projected controls. The projected controls include one or more driving inputs that the E2E model 260 determines to be applicable or a "best-fit" for controlling the vehicle 100 through the driving scene depicted by the sensor data 250.

Thus, at 330, the learning module 220 trains the E2E model 260. In one embodiment, the learning module 220 trains the E2E model 260 by comparing the projected controls with the expected controls from the labels/annotations of the sensor data 250. Thus, the learning module 220 can train the E2E model 260 according to a result of the comparison by, for example, adjusting node weights or other aspects of the E2E model 260. For example, the learning module 220, in one embodiment, backpropagates a result (e.g., binary determination of equivalence or a degree of difference) of the comparison to layers within the E2E model 260 to adjust and improve the manner in which the E2E model 260 provides the electronic outputs for the particular sensor inputs. In this way, the E2E model 260 uses the perceptions of the scene/surrounding environment as an input and provides driving controls (e.g., annotated labels) as an output as learned according to the labels/annotations of the sensor data 250. By way of example, the E2E model 260 can provide driving actions (e.g. "stop", "turn left", "move steering wheel by X", "change lanes" . . . ) classification and/or driving anticipation (e.g. predicting the trajectory), or other control indications for which training labels can be generated automatically from the sensor modalities on the moving platform as electronic outputs.

At 340, the learning module 220 determines whether the training is complete. In one embodiment, the learning module 220 iteratively processes the sensor data 250 at 320 and trains the E2E model at 330 by backpropagating results of the analysis to improve recognition by the E2E model 260. The learning module 220 may iteratively execute the noted functions over all available data of the sensor data 250 until the E2E model 260 satisfies a threshold for accurately identifying actions that correlate with the various driving scenes, or according to another suitable metric. In any event, the learning module 220 trains the E2E model 260 to provide outputs that correlate driving actions/tasks with sensor inputs.

At 350, the transfer module 230 transfers the learned information into the sub-modules 160. In one embodiment, the transfer module 230 parses the learned E2E model 260 as input and transfers relevant learned information contained within the E2E model 260 to the target driving/perception task modules with module 160. In various aspects, the transfer module 230 directly transfers information from the model 260 into the module 160. The transfer module 230 transfers, in one embodiment, a subset of feature or activation maps, learned nodal weights, and/or other aspects of the E2E model 260.

Moreover, in one approach, the transfer module 230 copies one or more internal layers of the E2E model 260 into the modules 160 and then adds module specific architectures on top of the copied layers from the model 260. In one embodiment, the transfer module 230 transfers the learned information according to a regularization-based transfer or another suitable approach for storing the learned information within the sub-modules of the autonomous driving module 160. As an additional matter, the training of the sub-modules through the transfer of the learned information can be undertaken as an initial setup phase of the autonomous driving module 160 of the vehicle 100 that occurs at a factory where the vehicle 100 is produced. Alternatively, the training of the sub-modules can occur on-the-fly, as an update to firmware of the vehicle 100, or according to another suitable timing and approach.

Whichever approach is undertaken to train the sub-modules, the transfer module 230 acquires the core learned information from the model 260 and imparts the information to the sub-modules with the autonomous driving module 160. Thus, the transfer module 230 effectively trains the sub-modules through this transfer of learned information but without specifically training the separate sub-modules and without using specific training data that is customized for the respective sub-modules. Because the learned information can be transferred from the broader approach of the E2E model 260 into the task-specific sub-modules, the training of the sub-modules is improved through more cost-effective training and improved accuracy.

At 360, the transfer module 230 refines the sub-modules after the sub-modules have been initialized with the learned information. In one embodiment, the transfer module 230 refines the sub-modules by further and separately training the sub-modules according to specific tasks of the sub-modules. That is, the transfer module 230 may train the sub-modules using annotated training data that is separate from the sensor data 250, and that is specific to the sub-modules in order to further refine the sub-modules on the particular task. Thus, the training system 170 can produce trained sub-modules for particular driving tasks that are trained according to one or more types of training data but that, in general, improve upon modules that are trained, for example, solely on customized training data for individual tasks.

At 370, the transfer module 230 provides the sub-modules as an output. In one embodiment, the transfer module 230 provides the sub-modules by electronically loading the modules into an autonomous driving system or memory of the vehicle 100. Moreover, in one embodiment, providing the sub-modules may include simply activating autonomous driving functionality such that the autonomous driving module 160 autonomously controls the vehicle 100 to navigate through an environment using the sub-modules.

Thus, the training system 170, in one embodiment, initializes the sub-modules to function in combination and achieve autonomous control of the vehicle 100. That is, the sub-modules control the vehicle 100 according to real-time sensor data to autonomously drive through an environment. Individually, the sub-modules generate information about particular aspects of the environment (e.g., object recognition, obstacle detection, path planning, etc.) for the vehicle 100 and collectively generate electronic driving controls that navigate the vehicle 100 through the driving scene embodied in the sensor inputs and for which the sub-modules have been trained to recognize appropriate driving actions. Thus, the initializing of the sub-modules using the learned information from the trained E2E model 260 improves the operation of the sub-modules to collectively control the vehicle 100 autonomously or at least semi-autonomously.

Figure 4:
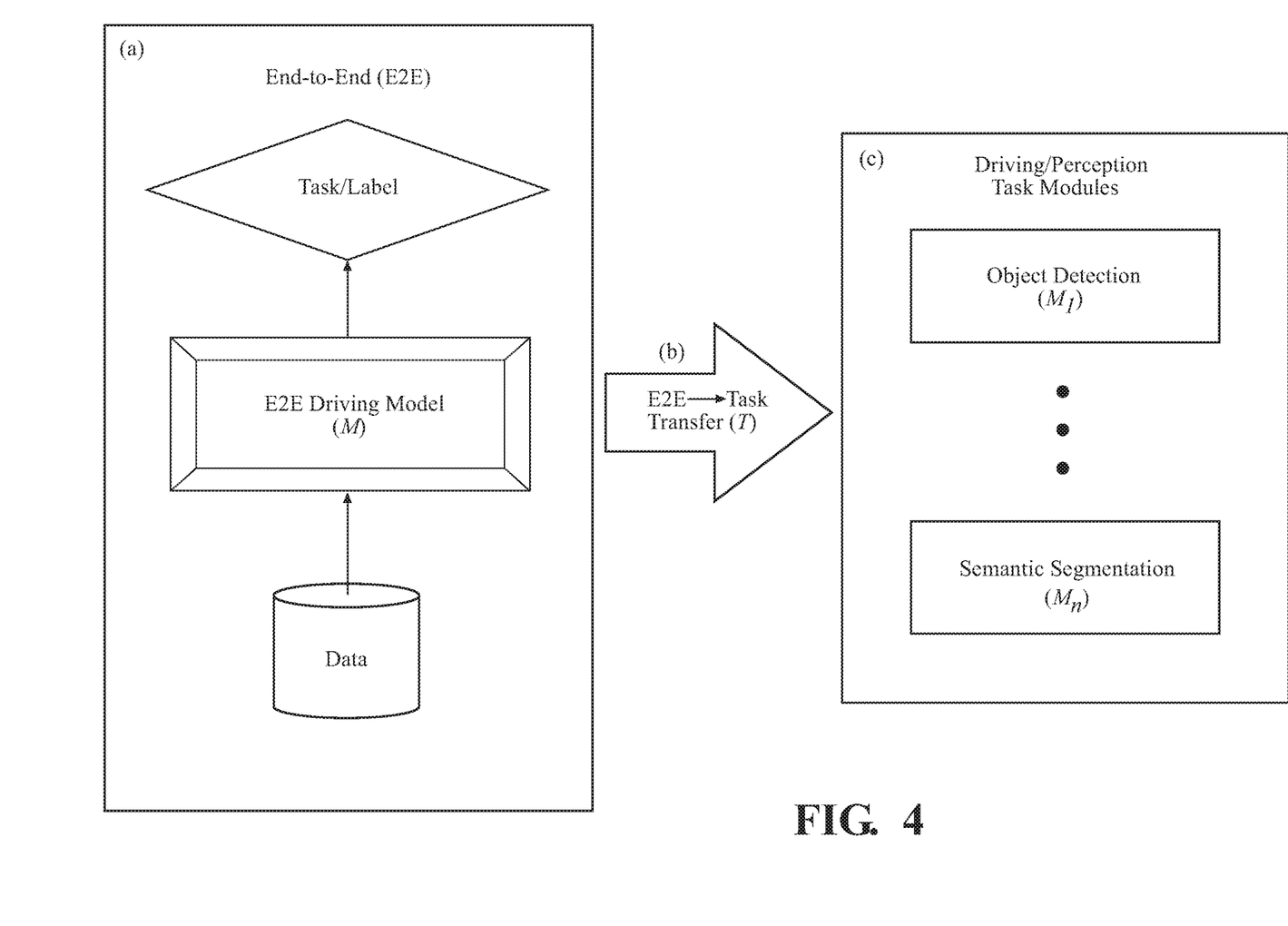
FIG. 4 illustrates one embodiment of a system diagram associated with training an E2E model and transferring information from the trained E2E model into sub-modules of an autonomous driving system.

With reference to FIG. 4, one example of a system diagram associated with training an E2E model and transferring information from the trained E2E model into sub-modules of an autonomous driving system is illustrated. In general, the system diagram of FIG. 4 illustrates a flow of electronic data and functions associated therewith. For example, block (a) illustrates the flow of data (e.g., sensor data 250) into the E2E driving model (M) which outputs determinations tasks/labels therefrom in either standard operation or as part of training the model (M). Once the E2E driving model (M) has been trained using the data, a transfer function (T) illustrated at block (b) parses the information from the E2E model (M) and provides the trained information into the sub-modules $M_1$-$M_n$ shown in block (c). Together the sub-modules $M_1$-$M_n$ form an autonomous driving system that shares information about various aspects of the driving process in order to autonomously control the vehicle.

In either case, in one approach, the sub-modules $M_1$-$M_n$ are further trained to refine operation of the sub-modules on associated tasks. Once further refined, the sub-modules process sensor data, generate intermediate determinations and ultimately control the vehicle autonomously as a function of the sensor data and intermediate determinations shared between the sub-modules.

Figure 5:
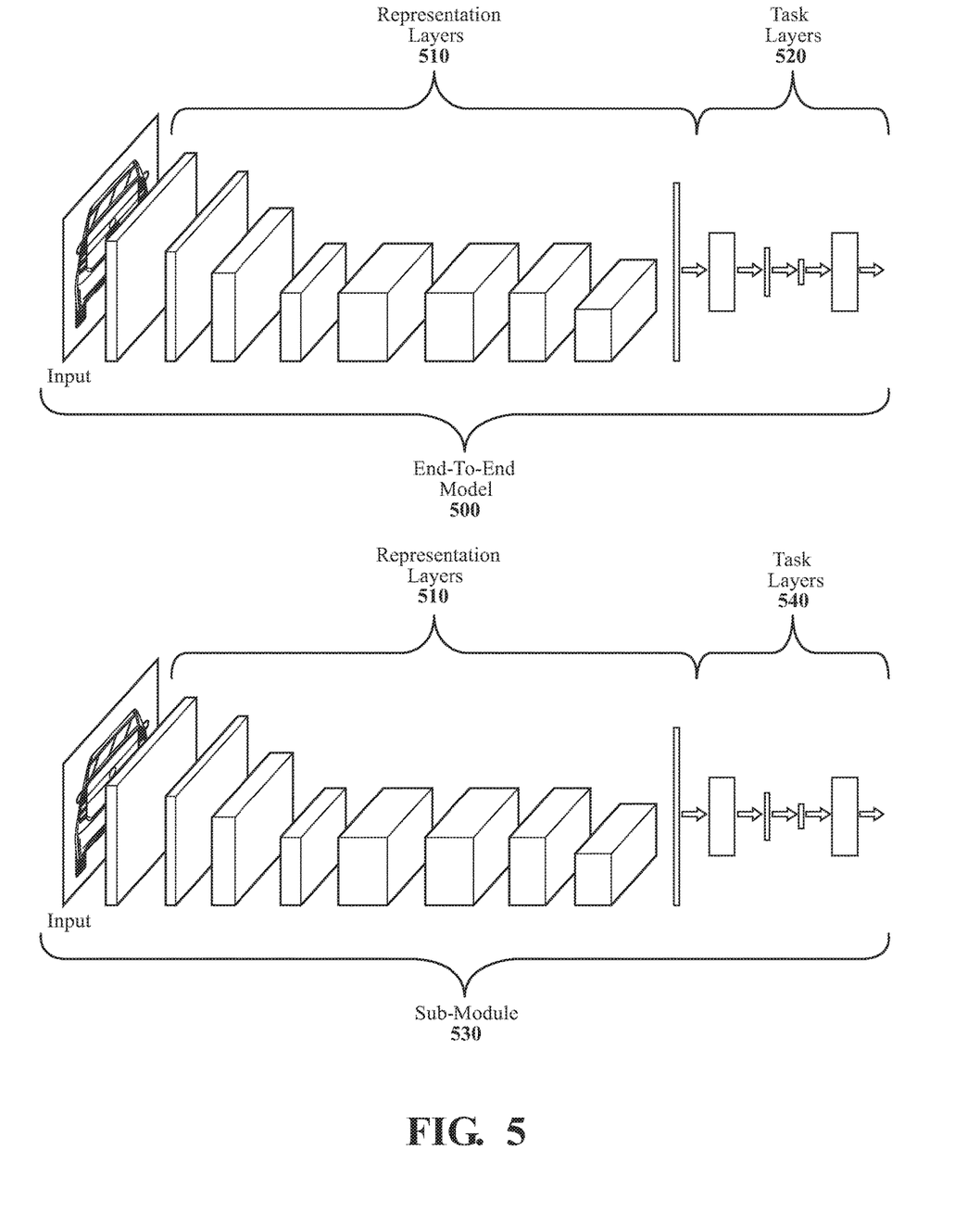
FIG. 5 illustrates one example of how learned information is transferred from an E2E model into a sub-module.

As an additional example, FIG. 5 illustrates an end-to-end model 500. As illustrated, the E2E model 500 includes two separate portions, a set of representation layers, and a set of task layers 520. The separate sets of layers are internal functional portions of a neural network or other machine learning model. In one embodiment, the separate layers correlate with multiple different neural networks that are implemented in combination.

The representation layers 510 generally perceive the aspects of the surrounding environment as embodied by sensor inputs provided thereto whereas the task layers 520 use determinations from the representation layers to generate, for example, driving tasks (e.g., electronic driving controls/projected controls). As an additional note, the E2E model 500 may include additional layers that are not illustrated prior to the representation layers. For example, the E2E model 500 may include filtering or pre-processing layers to transform and/or format the sensor inputs prior to processing by the representation layers 510. In either case, once the E2E model 500 is trained using the sensor data 250, the transfer module 230 parses or otherwise copies the representation layers 510 from the E2E model 500 and combines the layers 510 with task-specific layers 540 to form a sub-module 530. The task layers 540 are particular to a function of the sub-module 530 such as object detection, segmentation, etc. The transfer module 230 can initialize a plurality of sub-modules in the same manner by providing the learned information from the representation layers 510 of the E2E model 500 into the sub-modules. As previously noted, after initializing the sub-modules, the transfer module 230, in one embodiment, further trains the sub-modules according to respective tasks in order to refine the sub-modules.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As an additional note, while the sensor data 119 is discussed separately from the sensor data 250, in one or more embodiments, the sensor data 119 and the sensor data 250 are the same electronic data stored in different storage locations or are stored together in a single repository.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the training system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the training system 170, and/or the autonomous driving module(s) 160 may control some or all of these vehicle systems 140 and, thus, may be partially or fully autonomous.

The processor(s) 110, the training system 170, and/or the autonomous driving module(s) 160 can be operatively connected to communicate with the various vehicle systems 140 and/or individual components thereof. For example, returning to FIG. 1, the processor(s) 110, the training system 170, and/or the autonomous driving module(s) 160 can be in communication to send and/or receive information from the various vehicle systems 140 to control the movement, speed, maneuvering, heading, direction, etc. of the vehicle 100. The processor(s) 110, the training system 170, and/or the autonomous driving module(s) 160 may control some or all of these vehicle systems 140.

The processor(s) 110, the training system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the training system 170, and/or the autonomous driving module(s) 160 can control the direction and/or speed of the vehicle 100. The processor(s) 110, the training system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules 160 described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving modules 160 either independently or in combination can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transfer module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A training system for improving training of sub-modules for autonomously controlling a vehicle, comprising:
one or more processors;
a memory communicably coupled to the one or more processors and storing:
a learning module including instructions that when executed by the one or more processors cause the one or more processors to generate projected controls for autonomously controlling the vehicle through a driving scene by analyzing sensor data about the driving scene using an end-to-end (E2E) model, wherein the E2E model is based, at least in part, on at least one of the sub-modules,
wherein the learning module includes instructions to train the E2E model according to the projected controls and labels for the sensor data that indicate expected controls for driving the vehicle through the driving scene; and
a transfer module including instructions that when executed by the one or more processors cause the one or more processors to transfer electronic data of the E2E model into the at least one of the sub-modules associated with the E2E model to initialize the at least one of the sub-modules to improve operation of the at least one sub-modules at sub-tasks for autonomously controlling the vehicle.

2. The training system of claim 1, wherein the learning module includes instructions to train the E2E model including instructions to adjust values of the E2E model based, at least in part, on a result of comparing the projected controls with the expected controls as indicated by the labels for the sensor data,
wherein the E2E model is an extended deep learning model that is implemented to generate an electronic output for controlling the vehicle according to a particular driving task, wherein the sub-modules function in combination to autonomously control the vehicle, and wherein the sensor data includes perceived information from at least one sensor of the vehicle about the driving scene.

3. The training system of claim 1, wherein the transfer module includes instructions to transfer the electronic data including instructions to parse learned information from the E2E model and store the learned information within the sub-modules to initialize the sub-modules according to the learned information from training the E2E model, and wherein the learned information includes trained representation layers of the E2E model.

4. The training system of claim 3, wherein the transfer module includes instructions to transfer the electronic data according to a regularization-based transfer of learned information into the sub-modules.

5. The training system of claim 1, wherein the transfer module includes instructions to refine the at least one of the sub-modules initialized with the electronic data according to a driving task that is associated with the at least one of the sub-modules, wherein the driving task is an action event or perception event related to controlling the vehicle through the driving scene, and
wherein the projected controls include one or more actions of a set of driving inputs that are used to the control the vehicle through the driving scene depicted by the sensor data.

6. The training system of claim 1, wherein the sensor data is labeled according to at least driver inputs acquired in parallel with the sensor data to identify expected controls that maintain the vehicle along a path through the driving scene, wherein the sensor data is acquired from a plurality of sensors of the vehicle that are synchronized together to provide a combined perception of the driving scene.

7. The training system of claim 1, further comprising:
an autonomous driving module including the sub-modules that control the vehicle to autonomously drive through an environment by analyzing sensor inputs about the environment, wherein the sub-modules are initiated according to the electronic data from training the E2E model.

8. The training system of claim 1, wherein the sensor data is crowd-sourced from multiple different vehicles that provide the sensor data through a communications network.

9. A non-transitory computer-readable medium for improving training of sub-modules for autonomously controlling a vehicle and including instructions that when executed by one or more processors cause the one or more processors to:
generate projected controls for autonomously controlling the vehicle through a driving scene by analyzing sensor data about the driving scene using an end-to-end (E2E) model, wherein the E2E model is based, at least in part, on at least one of the sub-modules;
train the E2E model according to the projected controls and labels for the sensor data that indicate expected controls for driving the vehicle through the driving scene; and
transfer electronic data of the E2E model into the at least one of the sub-modules associated with the E2E model to initialize the at least one of the sub-modules to improve operation of the at least one sub-modules at sub-tasks for autonomously controlling the vehicle.

10. The non-transitory computer-readable medium of claim 9, wherein instructions to train the E2E model include instructions to adjust values of the E2E model based, at least in part, on a result of comparing the projected controls with the expected controls as indicated by the labels for the sensor data,
wherein the E2E model is an extended deep learning model that is implemented to generate an electronic output for controlling the vehicle according to a particular driving task, wherein the sub-modules function in combination to autonomously control the vehicle, and wherein the sensor data includes perceived information from at least one sensor of the vehicle about the driving scene.

11. The non-transitory computer-readable medium of claim 10, wherein the instructions to transfer the electronic data include instructions to parse learned information from the E2E model and store the learned information within the sub-modules to initialize the sub-modules according to the learned information from training the E2E model, and wherein the learned information includes trained representation layers of the E2E model.

12. The non-transitory computer-readable medium of claim 10, wherein the instructions include instructions to refine the at least one of the sub-modules according to a driving task that is associated with the at least one of the sub-modules, wherein the driving task is an action event or perception event related to controlling the vehicle through the driving scene, and wherein the projected controls include one or more actions of a set of driving inputs that are used to the control the vehicle through the driving scene depicted by the sensor data.

13. The non-transitory computer-readable medium of claim 10, wherein the sensor data is labeled according to at least driver inputs acquired in parallel with the sensor data to identify expected controls that maintain the vehicle along a path through the driving scene, and wherein the sensor data is acquired from a plurality of sensors of the vehicle that are synchronized together to provide a combined perception of the driving scene.

14. A method for improving training of sub-modules for autonomously controlling a vehicle, the method comprising:

generating projected controls for autonomously controlling the vehicle through a driving scene by analyzing sensor data about the driving scene using an end-to-end (E2E) model, wherein the E2E model is based, at least in part, on at least one of the sub-modules;

training the E2E model according to the projected controls and labels for the sensor data that indicate expected controls for driving the vehicle through the driving scene; and transferring electronic data of the E2E model into the at least one of the sub-modules associated with the E2E model to initialize the at least one of the sub-modules to improve operation of the at least one sub-modules at sub-tasks for autonomously controlling the vehicle.

15. The method of claim 14, wherein training the E2E model includes adjusting values of the E2E model based, at least in part, on a result of comparing the projected controls with the expected controls as indicated by the labels for the driving scene, wherein the E2E model is an extended deep learning model that is implemented to generate an electronic output for controlling the vehicle according to a particular driving task, wherein the sub-modules function in combination to autonomously control the vehicle, and wherein the sensor data includes perceived information from at least one sensor of the vehicle about the driving scene.

16. The method of claim 14, wherein transferring the electronic data includes parsing learned information from the E2E model and storing the learned information within the sub-modules to initialize the sub-modules according to the learned information from training the E2E model, and wherein the learned information includes trained representation layers of the E2E model.

17. The method of claim 16, wherein the transferring is a regularization-based transfer of the learned information into the sub-modules.

18. The method of claim 14, further comprising:

refining the at least one of the sub-modules initialized with the electronic data according to a driving task that is associated with the at least one of the sub-modules, wherein the driving task is an action event or perception event related to controlling the vehicle through the driving scene, wherein the projected controls include one or more actions of a set of driving inputs that are used to the control the vehicle through the driving scene depicted by the sensor data.

19. The method of claim 14, wherein the sensor data is labeled according to at least driver inputs acquired in parallel with the sensor data to identify controls that maintain the vehicle along a path through the driving scene, wherein the sensor data is acquired from a plurality of sensors of the vehicle that are synchronized together to provide a combined perception of the driving scene.

20. The method of claim 14, further comprising:

controlling the vehicle to autonomously drive through an environment by generating controls for the vehicle using the sub-modules to analyze sensor inputs about the environment, wherein the sub-modules are initiated according to the electronic data from training the E2E model.

* * * * *